United States Patent [19]

Mizuno et al.

[11] Patent Number: 4,736,626
[45] Date of Patent: Apr. 12, 1988

[54] ABNORMALITY DETECTION APPARATUS FOR VEHICLE ENGINES

[75] Inventors: Toshiaki Mizuno, Nagoya; Katuhiko Kodama, Obu, both of Japan

[73] Assignee: Nippondenso Co., Ltd., Kariya, Japan

[21] Appl. No.: 38,355

[22] Filed: Apr. 14, 1987

[30] Foreign Application Priority Data

Apr. 16, 1986 [JP] Japan .................................. 61-87364
Apr. 16, 1986 [JP] Japan .................................. 61-87365

[51] Int. Cl.⁴ .......................................... G01M 15/00
[52] U.S. Cl. ................................ 73/117.3; 364/431.07
[58] Field of Search ..................... 73/118.1, 2, 117.3; 74/859, 872; 340/62; 364/551, 431.07

[56] References Cited

U.S. PATENT DOCUMENTS 4,233,599 11/1980 Brearley ................................ 340/679
4,564,916 1/1986 Hori et al. ............................. 364/551

FOREIGN PATENT DOCUMENTS 59-165841 9/1984 Japan .

Primary Examiner—Jerry W. Myracle
Attorney, Agent, or Firm—Cushman, Darby & Cushman

[57] ABSTRACT

In an abnormality detection apparatus for vehicle engines, a deceleration discriminating circuit discriminates a deceleration state of a vehicle engine on the basis of a running state of the engine detected by a running state detector for detecting a running state of the vehicle engine. When the deceleration discriminating circuit determines that the engine is being in deceleration state, a comparing circuit compares a vehicle speed detected by a vehicle speed detector with a predetermined value. An abnormality deciding circuit is responsive to a comparison result signal from the comparing circuit to decide abnormality of the vehicle speed detector.

6 Claims, 7 Drawing Sheets

ABNORMALITY DETECTION APPARATUS FOR VEHICLE ENGINES

BACKGROUND OF THE INVENTION

This invention relates to an abnormality detection apparatus for vehicle engines especially for detecting abnormality in a vehicle speed sensor system used for controlling the vehicle engine.

In the vehicle engine, a signal from a vehicle speed sensor (vehicle speed signal) has conventionally been used as one of important parameters for controlling the engine. For example, the vehicle speed signal is used for deciding an idle state in controlling the number of idling rotations.

In the event that a signal line for transmitting the vehicle speed signal to a control computer is broken or a connector for the signal line is accidentally disconnected with the result that the transmission of the speed signal to the control computer is prevented, troubles will be raised in various modes of engine control. For example, in the feedback control of the idle rotation number, the idle state becomes indistinguishable from a deceleration state and even the deceleration state is erroneously decided to be the idle state, with the result that the amount of air is decreased to decrease the rotation number and consequently engine stall tends to occur. Further, a speed limiter, provided for performing fuel cut when the vehicle speed exceeds a predetermined value, will become unable to function. In view of the above, an abnormality detecting apparatus for detecting breaking of the speed signal line has conventionally been proposed, as disclosed in, for example, Japanese Laid Open Publication No. 59-165841. According to the detector described in this publication, when an engine rotation number (N) in excess of a predetermined value, an engine load (Q/N) in excess of a predetermined value and a vehicle speed short of a predetermined value are all detected, the speed signal line is decided to be broken.

The detector described in the aforementioned publication is however disadvantageous in that when the discrimination levels for the engine rotation number (N) and the engine load (Q/N) are high (large), the detector is not used frequently to decrease its operating ratio and that conversely, when both the discrimination levels are low (small), the detector tends to face a failure to distinguish the breaking of the speed signal line from the stopping of the vehicle and there is a possibility that errors in detection occur. Because of the above problems, it is difficult for the prior art detector to obtain compatibility of detection accuracy and operating ratio. In addition, when no-load high speed rotation (racing) is carried out in cold weathers by the driver immediately after the engine has started, the requirements prescribed by the aforementioned publication for giving a decision on the breaking of the speed signal line may sometimes be satisfied, thus also inviting the possibility of the occurrence of an erroneous detection.

SUMMARY OF THE INVENTION

It is an object of the present invention to provide an abnormality detection apparatus for vehicle engines which can improve both the detection accuracy and operating ratio to thereby eliminate the problems encountered in the prior art detecting apparatus.

According to the invention, the above object can be accomplished by an abnormality detection apparatus for vehicle engines comprising vehicle speed detecting means for detecting a speed of a vehicle, running state detecting means for detecting a running state of a vehicle engine, deceleration state discriminating means for discriminating a deceleration state of the engine on the basis of the engine running state detected by the running state detecting means, comparing means for comparing the vehicle speed detected by the vehicle speed detecting means with a predetermined value when the deceleration state discriminating means determines that the engine is being in the deceleration state, measuring means for measuring duration during which the comparing means determines that the vehicle speed is below the predetermined value, and abnormality deciding means for determining that the vehicle speed detecting means is abnormal when the duration measured by the measuring means exceeds a predetermined value.

With the above construction, when the engine is being in a deceleration state, the deceleration state discriminating means determines the deceleration state. The deceleration state allows the engine to be rotated by the vehicle (i.e. engine brake to be effected) and it is ordinarily meant by the rotation of the engine by the vehicle that the vehicle runs at a speed in excess of a predetermined value. Accordingly, when the engine is allowed to be rotated by the vehicle, the vehicle speed detected by the vehicle speed detecting means exceeds, in normality, the predetermined value. When the comparing means decides that the vehicle speed detected by the vehicle speed detecting means is below the predetermined value and then the measuring means determines the duration in excess of the predetermined value, the abnormality deciding means determines that the vehicle speed detecting means is abnormal, indicating that, for example, the vehicle speed signal line is broken.

DESCRIPTION OF THE PREFERRED EMBODIMENTS

The invention will now be described by way of example with reference to the accompanying drawings.

Figure 1:
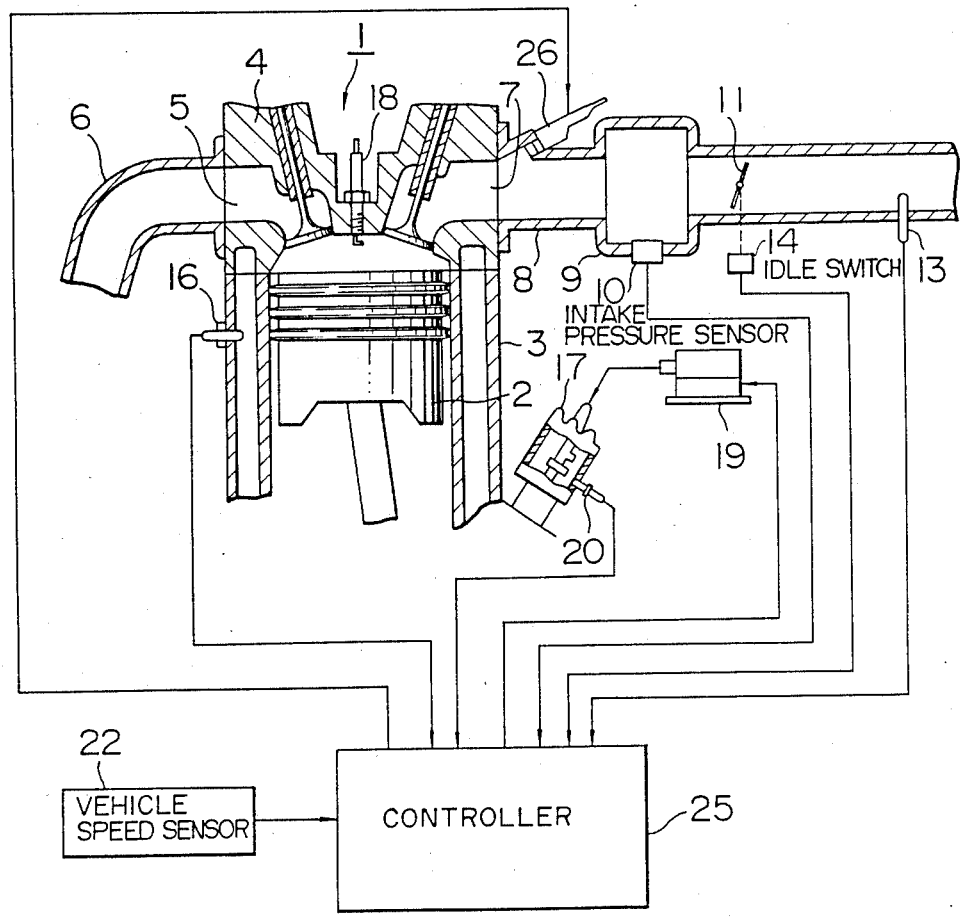
FIG. 1 is a schematic diagram illustrating a vehicle engine and peripheral units associated therewith to which the invention is applied.

FIG. 1 schematically shows an engine and peripheral units therefor to which the invention is applied.

Referring to FIG. 1, there are illustrated a sparking type vehicle engine 1, a piston 2, a cylinder 3 and a cylinder head 4. The cylinder head 4 has an exhaust port 5 for each cylinder which is connected with an exhaust manifold 6 and has an intake port 7 for each cylinder which is connected with an intake manifold 8. The intake manifold 8 is provided with a surge tank 9 for preventing pulsation of suctioned air. Mounted to the surge tank 9 is an intake pressure sensor 10 for detecting a pressure in the intake manifold 8, i.e., an intake pipe pressure Pm.

A throttle valve 11 controls the amount of air suctioned to each cylinder through the surge tank 9, and an intake temperature sensor 13 detects temperatures of the suctioned air. Directly connected to the throttle valve 11 is an idle switch 14 which is turned on only when the throttle valve 11 takes the full-close position. A water temperature sensor 16 detects temperatures of cooling water for the engine, and a distributor 17 applies to an ignition plug 18 of the engine 1 a high voltage supplied from an igniter at a predetermined timing. A rotation number sensor 20 mounted to the distributor 17 generates a pulse signal corresponding to a rotation number of the engine 1, and a vehicle speed sensor 22 provided for a change gear (not shown) generates a pulse signal corresponding to a vehicle speed on the basis of the rotation of the output shaft of the change gear.

Detection signals from the intake pressure sensor 10, intake temperature sensor 13, idle switch 14, water temperature sensor 16, rotation number sensor 20 and vehicle speed sensor 22 are applied to a controller 25. On the basis of the detection signals, the controller 25 performs various modes of control such as control of the amount of fuel injected from a fuel injection valve 26 and control of a timing for firing the ignition plug 18 and decides, as will be described later, abnormality of the detection signal from the vehicle speed sensor 22.

Figure 2:
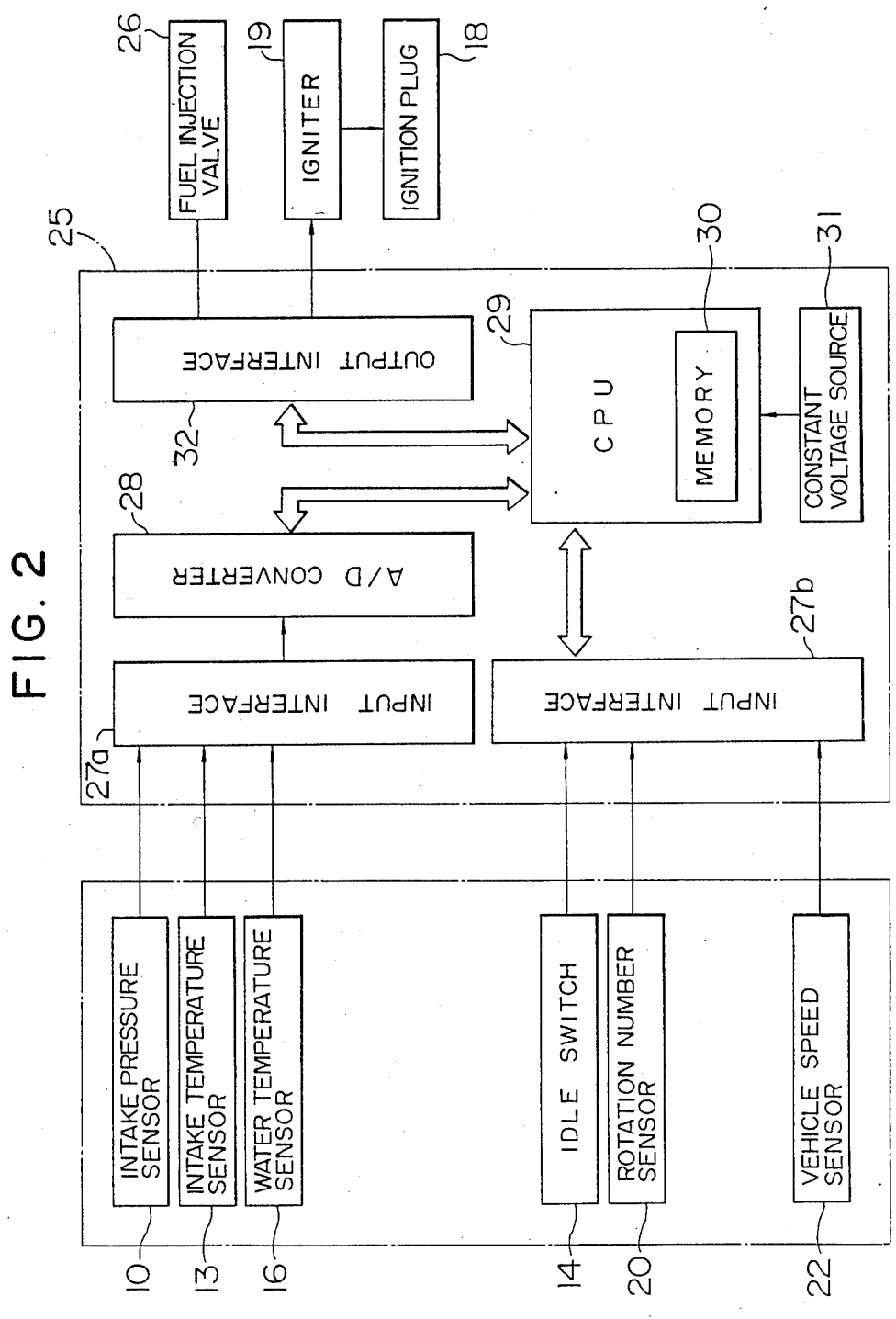
FIG. 2 is a block diagram illustrating the construction of a controller shown in FIG. 1.

FIG. 2 shows, in block form, the construction of the controller 25. Referring to FIG. 2, there are seen an input interface 27a and an input interface 27b. Applied to the input interface 27a are analog signals from the intake pressure sensor 10, intake temperature sensor 13 and water temperature sensor 16. Applied to the input interface 27b are digital signals from the idle switch 14, rotation number sensor 20 and vehicle speed sensor 22. An A/D converter 28 converts the analog signals received by the input interface 27a into digital signals. The digital signals received by the input interface 27b and delivered out of the A/D converter 28 are applied to a central processing unit (hereinafter referred to as a CPU) 29.

The CPU 29 includes a memory 30 for storing programs for processing various operations and data used for the operations. The CPU 29 uses the digital signals from the A/D converter 28 as parameters to decide, as will be described later, abnormality of the signal from the vehicle speed sensor 22 and to execute operations for the wellknown fuel injection control and firing timing control, in accordance with the programs stored in the memory 30.

A constant voltage source 31 feeds the CPU 29, and an output interface 32 supplies, as necessary, control signals from the CPU 29 to the fuel injection valve 26 and igniter 19. The fuel injection valve 26 responds to the control signal from the CPU 29 to inject fuel and the ignition plug 18 is fired in response to the control signal applied to the igniter 19.

Figure 3:
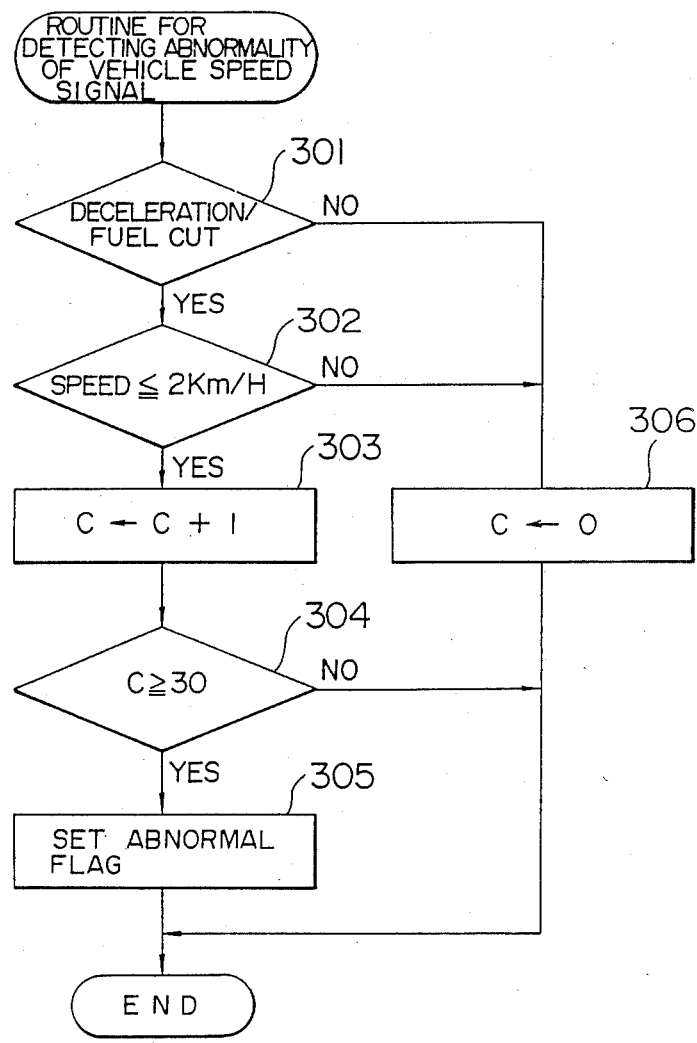
FIGS. 3, 4, 5 and 6 are flow charts respectively illustrating routines for detecting abnormality in vehicle speed signal according to first to fourth embodiments of the invention.

A first embodiment of the invention wherein the signal from the vehicle speed sensor 22 is decided to be abnormal will be described by referring to a routine for detecting abnormality of the vehicle speed signal as shown in FIG. 3. This routine is executed by the CPU 29 at a predetermined period, for example, every 100 mS.

A step 301 decides whether the engine 1 is being decelerated and concurrently fuel cut is being undertaken. Another routine fills, in advance, the role of proceeding with the fuel cut during the engine deceleration. Exemplarily, the fuel cut is undertaken when the idle switch 14 is turned on and concurrently a rotation number N of the engine 1 calculated from a pulse signal delivered out of the rotation number sensor 20 exceeds a predetermined rotation number. No preset in accordance with a cooling water temperature detected by the water temperature sensor 16. If the step 301 determines that the deceleration/fuel cut is being undertaken, a step 302 decides whether a vehicle speed calculated from a vehicle speed signal produced from the vehicle speed sensor 22 is below a predetermined value, for example, 2 Km/H. If the vehicle speed is below the predetermined value, a step 303 counts up by 1 (one) a counter C incorporated in the memory 30 of the CPU 29. A step 304 then decides whether the content of the counter C exceeds 30 and given the content of the counter C being in excess of 30 ($C \geq 30$), a step 305 determines abnormality of the vehicle speed signal and sets an abnormal flag, thus ending this routine. If the content of the counter C is short of 30 ($C < 30$), the step 305 is bypassed and this routine ends. When either of the steps 301 and 302 determines "NO", a step 306 clears the content of the counter C, thus ending this routine.

As is clear from the above, in the routine for detecting abnormality of the vehicle speed signal according to the first embodiment, the step 301 decides whether the deceleration/fuel cut is being undertaken to thereby discriminate whether the engine 1 is allowed to be rotated by the vehicle (i.e. engine brake is effected). The occurrence of abnormality in the vehicle speed is decided through the steps 302 to 305 when the engine is being in a deceleration state, the engine 1 is allowed to be rotated by the vehicle and the duration of the vehicle speed of less than the predetermined value (2 Km/H) calculated from the vehicle speed signal exceeds a predetermined value (3 seconds).

In the above routine for detecting abnormality of the vehicle speed signal, the vehicle speed signal is decided to be abnormal when the state in which the deceleration/fuel cut is undertaken and concurrently the vehicle speed is equal to or less than 2 Km/H continues for more than the predetermined time (3 seconds). Incidentally, there is a possibility that the vehicle speed $\leq 2$ Km/H is temporarily established during the deceleration/fuel cut, for example, either when the engine is caused to stall by being coupled to the clutch owing to inadvertent clutch engagement by the driver who is driving the vehicle to decelerate it for stopping or after the engine 1 is driven by the driver for no-load high speed rotation (racing). The above-described routine is provided for preventing erroneous detections in such events.

According to the first embodiment of the routine for detecting abnormality of the vehicle speed signal, abnormality of the vehicle speed signal can be detected during the deceleration/fuel cut. Therefore, the abnormality detection is performed relatively frequently and a high operating ratio can be ensured. In addition, the state in which the engine 1 is allowed to be rotated by the vehicle (i.e. engine brake is effected) so that the vehicle is proven to run at an appreciable speed can be discriminated, thereby also ensuring a high detection accuracy.

Figure 4:
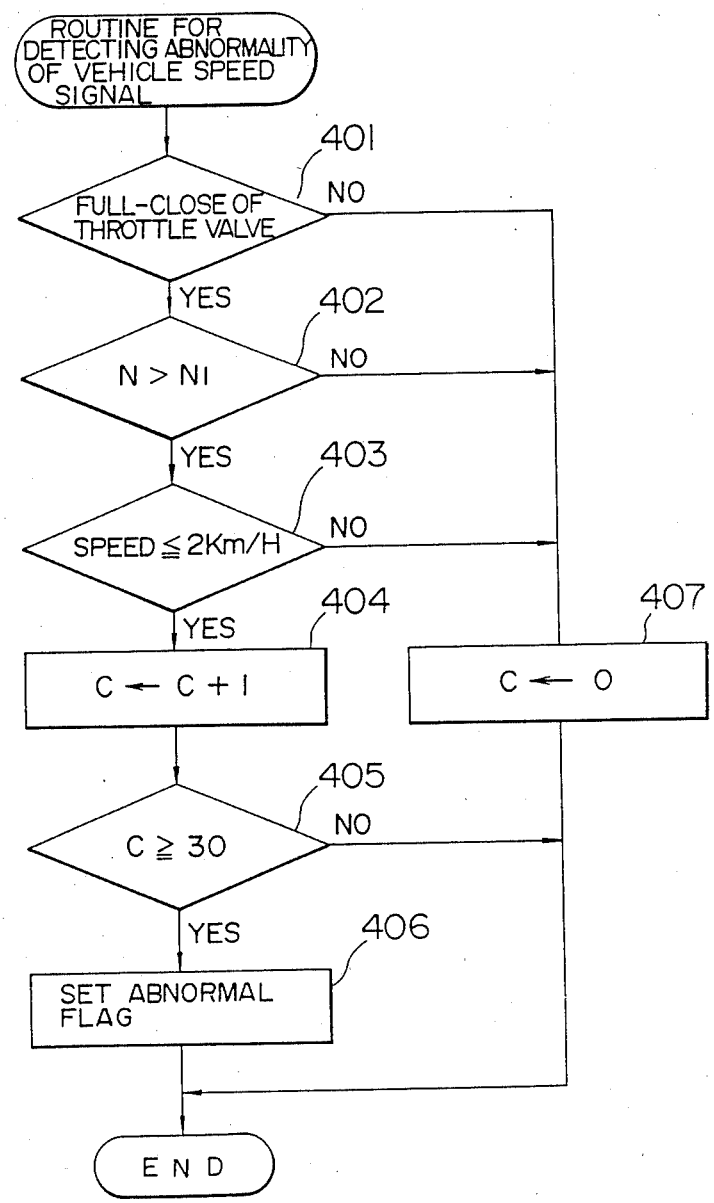

FIG. 4 shows a second embodiment of the invention. In the first embodiment, the state in which the engine 1 is allowed to be rotated by the vehicle (i.e. engine brake is effected) during engine deceleration is discriminated on the basis of the deceleration/fuel cut. Contrary to this, in the abnormality detection routine shown in FIG. 4, the state in which the engine 1 is allowed to be rotated by the vehicle (i.e. engine brake is effected) during engine deceleration is discriminated when the throttle valve is fully closed, indicating that the idle switch 14 is turned on (step 401) and concurrently the rotation number N exceeds a comparative rotation number $N_1$ which is preset in accordance with a cooling water temperature as indicated in a map of FIG. 7. To set the comparative rotation number $N_1$, a value is used which corresponds to a maximum idle rotation number expected for a given cooling water temperature and added with a predetermined rotation number. Thus, the comparative rotation number $N_1$ is considered to be a lower limit rotation number for the state in which engine brake is effected with the throttle valve fully closed and the clutch engaged, i.e., the state in which the vehicle undergoes decelerated running at an appreciable vehicle speed.

When both the steps 401 and 402 determine "YES", abnormality of the vehicle speed is detected through steps 403, 404, 405 and 406 which respectively correspond to the step 302 and ensuing steps of the abnormality detection routine according to the first embodiment. When the steps 401 to 403 determine "NO", a step 407 corresponding to the step 306 clears the content of the counter C (C→O), thus ending this routine.

The abnormality detection routine of the second embodiment can attain the same effects as those by the abnormality detection routine of the first embodiment shown in FIG. 3.

Figure 5:
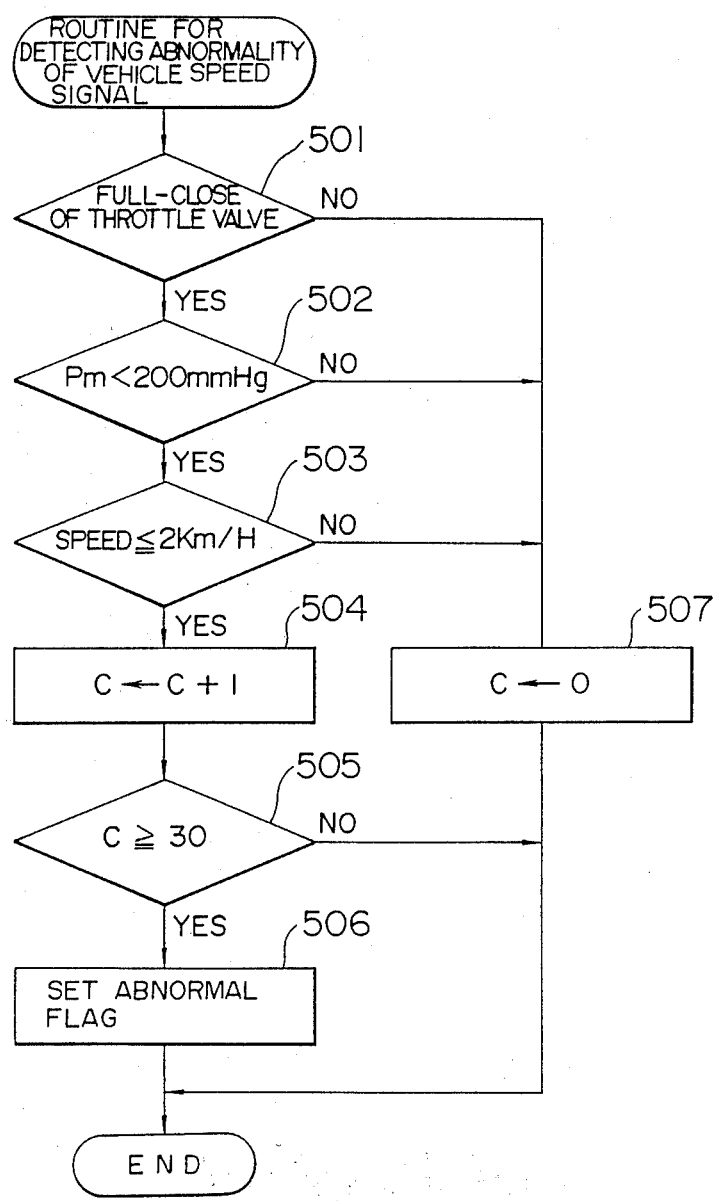

FIG. 5 shows a third embodiment of the invention. In a routine for detecting abnormality of the vehicle speed signal according to the third embodiment, steps 503 to 507 respectively correspond to the steps 302 to 306 in the abnormality detection routine according to the first embodiment or the steps 403 to 407 in the abnormality detection routine according to the second embodiment. Like the step 301 of the first embodiment or the steps 401 and 402 of the second embodiment, steps 501 and 502 of the third embodiment decide whether the engine 1 is allowed to be rotated by the vehicle (i.e. engine brake is effected) during engine deceleration. In this routine, the step 501 decides whether the throttle valve is fully closed, indicating that the idle switch 14 is turned on and the step 502 decides an intake pressure Pm (absolute pressure) detected by the intake pressure sensor 10 is below a preset pressure value (200 mmHg). Only when both the steps 501 and 502 determine "YES", this routine proceeds to the step 503. Since, with the throttle valve fully closed, the amount of air suctioned into the engine 1 is substantially constant and the constant amount of suctioned air is approximately in proportion to the product of rotation number N and intake pressure Pm, the preset pressure value to be compared with the intake pressure Pm has substantially the same meaning as that of the comparative rotation number $N_1$ indicated in the step 402 of the FIG. 4 second embodiment. More particularly, if the engine exceeds the predetermined rotation number when the throttle valve is fully closed, the intake pressure Pm falls below the preset pressure. Based on this phenomenon, the step 502 decides whether when the throttle valve is fully closed, the engine is subjected to an intake pressure which corresponds to a slightly higher idle rotation number.

Accordingly, the third embodiment can also attain the same effects as those by the second embodiment.

In order for the third embodiment to accurately discriminate the state in which the engine 1 is allowed to be rotated by the vehicle during engine deceleration, engagement or disengagement of the clutch is detected. The routines of FIGS. 3, 4 and 5 may be modified so as to proceed to the steps 302, 403 and 503, respectively, when the clutch is being in engagement.

As is clear from the foregoing description, when the vehicle speed sensor is decided to be abnormal, the feedback control for the idle rotation number is not executed even if the idle state is determined. Instead, open loop control is executed in accordance with loads imposed on the engine by engine cooling water temperatures and auxiliary devices driven by the engine such as an air conditioner and an alternator.

Figure 6:
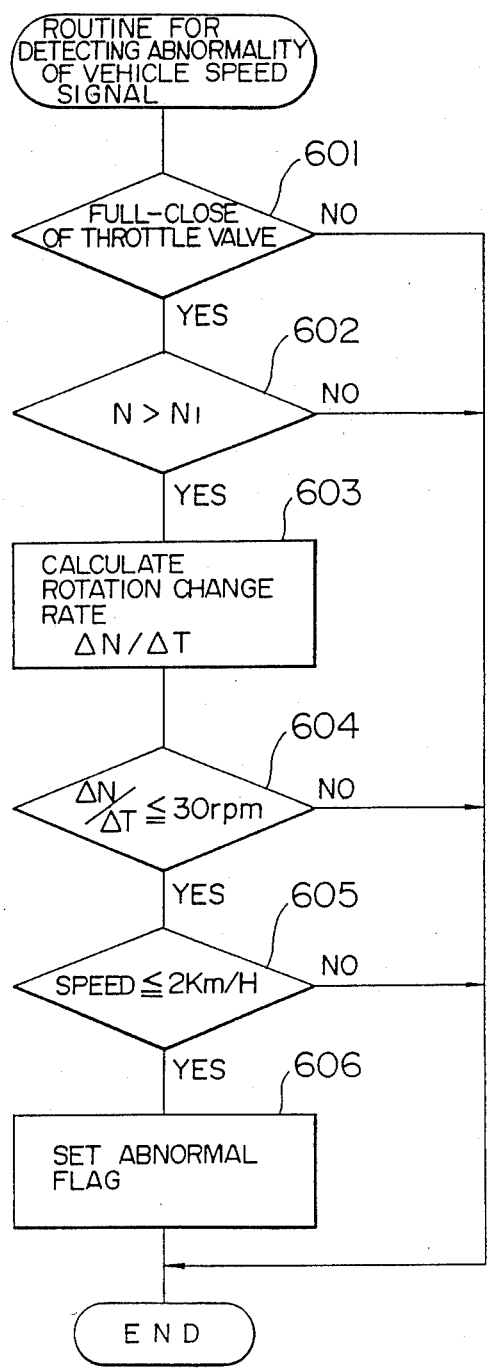

A fourth embodiment of the invention will be described by referring to a routine for detecting abnormality of the vehicle speed signal as shown in FIG. 6.

A step 601 decides whether the throttle valve 11 is fully closed, i.e., the idle switch 14 is turned on. If "YES", the routine proceeds to a step 602 and if "NO", the step 602 and ensuing steps are all bypassed and this routine ends.

Figure 7:
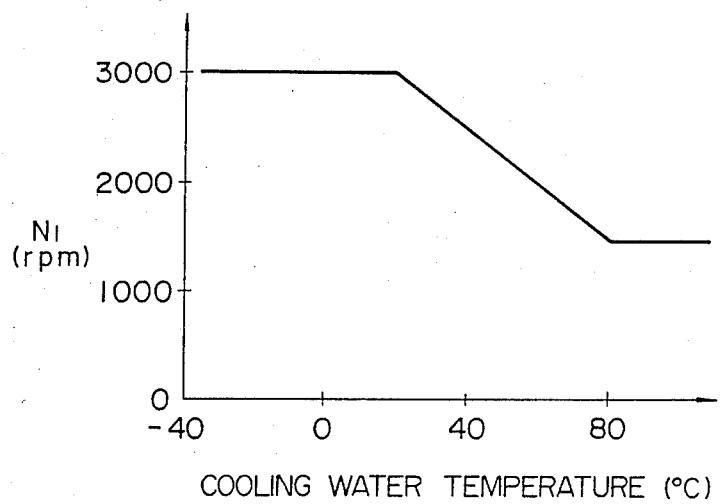
FIG. 7 is a graph showing the relation between cooling water temperature and engine rotation number.

A step 602 decides whether a rotation number N of the engine 1 calculated from a pulse signal produced from the rotation number sensor 20 is higher than a preset rotation number $N_1$ determined in accordance with a cooling water temperature of the engine 1 as shown in the map of FIG. 7. IF "YES", this routine proceeds to a step 603 and if "NO", the step 603 and ensuing steps are all bypassed, thus ending this routine. The preset rotation number $N_1$ is of a value which is slightly higher than a maximum idle rotation number for a given cooling water temperature. More specifically, the preset rotation number corresponds to a lower limit rotation number for the state wherein the throttle valve 11 is fully closed and concurrently the vehicle runs under engagement of the clutch, indicating that, for example, the vehicle is subjected to decelerated running under the effectuation of engine brake.

The step 603 calculates a rate of change of rotation $\Delta N/\Delta T$ under an engine state which satisfies the requirements prescribed by the steps 601 and 602. This routine is executed every predetermined period (every 100 mS) by timer interruption. In particular, the step 603 therefore stores, in advance, a rotation number N' calculated during the preceding execution of this routine into the memory 30, calculates a difference $\Delta N$ between the N' and a rotation number N calculated during the current execution of this routine, and calculates a change of rotation $\Delta N$ per the predetermined period (per 100 mS), i.e., a rotation change rate $\Delta N/\Delta T$. The step 603 makes itself ready for the subsequent execution of this routine by storing the rotation number N' calculated during the current execution of this routine into the memory 30.

A step 604 decides whether the rotation change rate $\Delta N/\Delta T$ calculated by the step 603 is short of a preset rotation change rate, for example, 30 rpm. When the rotation change rate is higher than the preset rotation change rate, steps following the step 604 are all bypassed and this routine ends. When the rotation change rate is below the preset rotation change rate, the step 604 discriminates a state in which the clutch is in engagement and concurrently the vehicle runs at an appreciable speed, for example, a state in which the vehicle is subjected to decelerated running under the effectuation of engine brake. The routine then proceeds to a step 605. The preset rotation change rate is of a value which is larger than a maximum value of rotation change rate obtained when the clutch is in engagement and quick brake is effected.

The step 605 decides whether a vehicle speed calculated from a vehicle speed signal produced from the vehicle speed sensor 22 is below a preset value, for example, 2 Km/H. When the vehicle speed is short of the preset value, the step 605 determines that the vehicle speed calculated from the vehicle speed signal delivered out of the vehicle speed sensor 22 is too low to meet the running state of the vehicle determined for agreement (YES) through the steps 601 and 602, thus determining abnormality of the vehicle speed signal. The routine then proceeds to a step 606. The step 606 sets an abnormal flag indicative of the abnormality of the vehicle speed and this routine ends. If the vehicle speed exceeds the preset value, the step 606 is bypassed to end this routine.

The fourth embodiment can detect, accurately within minimized time, abnormality of the vehicle speed signal from the vehicle speed sensor 22, the abnormality being exemplarily represented by breaking of the vehicle speed signal line. When the throttle valve 11 is fully closed, the rotation number N exceeds the preset rotation number $N_1$ and the rotation change rate $\Delta N/\Delta T$ is short of the preset rotation change rate, a vehicle running state is undertaken wherein the vehicle is subjected to deceleration under engine brake effected for stopping by the driver. Therefore, the step 605 in this routine is executed relatively frequently during ordinary vehicle running, in other words, used sufficiently frequently even during ordinary vehicle running, thereby improving the operating ratio.

We claim:

1. An abnormality detection apparatus for vehicle engines comprising:
   vehicle speed detecting means for detecting a speed of a vehicle;
   running state detecting means for detecting a running state of a vehicle engine;
   deceleration state discriminating means for discriminating a deceleration state of said engine on the basis of the engine running state detected by said running state detecting means;
   comparing means for comparing said vehicle speed detected by said vehicle speed detecting means with a predetermined value when said deceleration state discriminating means determines that said engine is being in the deceleration state; and
   abnormality deciding means responsive to a comparison result signal from said comparing means to decide abnormality of said vehicle speed detecting means.

2. An abnormality detection apparatus for vehicle engines according to claim 1 further comprising measuring means for measuring duration during which said comparing means determines that the vehicle speed is below said predetermined value, wherein said abnormality deciding means determines abnormality of said vehicle speed detecting means when the duration measured by said measuring means exceeds a predetermined value.

3. An abnormality detection apparatus for vehicle engines according to claim 1 wherein said running state detecting means comprises full-close position detecting means for detecting the full-close position of a throttle valve, and rotation number detecting means for detecting the rotation number of said vehicle engine.

4. An abnormality detection apparatus for vehicle engines according to claim 3 wherein said deceleration state discriminating means comprises:
   specified running state detecting means responsive to said full-close position detecting means and said rotation number detecting means to detect a specified running state in which said throttle valve is held in the full-close position and the rotation number exceeds a preset rotation number;
   rotation change rate calculating means responsive to the rotation number detected by said rotation number detecting means to calculate a rotation change rate when said specified running state is being detected; and
   rotation change rate comparing means for comparing said rotation change rate with a preset rotation change rate.

5. An abnormality detection apparatus for vehicle engines comprising:
   vehicle speed detecting means for detecting a speed of a vehicle;
   running state detecting means for detecting a running state of a vehicle engine;
   deceleration state discriminating means for discriminating a deceleration state of said engine on the basis of the engine running state detected by said running state detecting means;
   comparing means for comparing said vehicle speed detected by said vehicle speed detecting means with a predetermined value when said deceleration state discriminating means determines that said engine is being in the deceleration state;
   measuring means for measuring duration during which said comparing means determines that the vehicle speed is below said predetermined value; and
   abnormality deciding means for determining that said vehicle speed detecting means is abnormal when the duration measured by said measuring means exceeds a predetermined value.

6. An abnormality detection apparatus for vehicle engines comprising:
   vehicle speed detecting means for detecting a speed of a vehicle;
   full-close position detecting means for detecting the full-close position of a throttle valve;
   rotation number detecting means for detecting a rotation number of a vehicle engine;
   specified running state detecting means responsive to said full-close position detecting means and said rotation number detecting means to detect a specified running state in which said throttle valve is held in the full-close position and the rotation number exceeds a preset rotation number;
   rotation change rate calculating means responsive to the rotation number detected by said rotation number detecting means to calculate a rotation change rate when said specified running state is being detected;
   rotation change rate comparing means for comparing said rotation change rate with a preset rotation change rate;
   vehicle speed comparing means for comparing said vehicle speed detected by said vehicle speed detecting means with a preset vehicle speed when said rotation change rate comparing means determines that said rotation change rate is below said preset rotation change rate; and
   abnormality deciding means for determining that said vehicle speed detecting means is abnormal when said vehicle speed comparing means determines that said vehicle speed is below said preset vehicle speed.

* * * * *